United States Patent [19]
Kieswetter, Jr. et al.

[11] 3,951,649
[45] Apr. 20, 1976

[54] PROCESS FOR THE RECOVERY OF COPPER

[75] Inventors: Olmedo Kieswetter, Jr., Old Hickory, Tenn.; Cedomir M. Sliepcevich, Norman, Okla.

[73] Assignee: University Engineers, Inc., Norman, Okla.

[22] Filed: Aug. 19, 1974

[21] Appl. No.: 498,422

[52] U.S. Cl. ................................ 75/117; 75/104; 75/115; 204/117; 204/119; 210/38 B; 75/72
[51] Int. Cl.² .......................................... C22B 15/00
[58] Field of Search ............... 75/117, 104, 72, 74, 75/112, 114, 115; 204/107, 111, 117, 129; 210/38

[56] References Cited
UNITED STATES PATENTS

| | | | |
|---|---|---|---|
| 1,588,806 | 6/1926 | Pike et al. | 75/117 |
| 2,662,009 | 12/1953 | Roberts et al. | 75/117 |
| 2,831,763 | 4/1958 | Nashner et al. | 75/117 |
| 3,666,446 | 5/1972 | Cook et al. | 75/117 |
| 3,689,248 | 9/1972 | Mehl | 75/117 |
| 3,785,944 | 1/1974 | Atwood et al. | 204/107 |
| 3,798,026 | 3/1974 | Milner et al. | 75/117 |
| 3,833,351 | 9/1974 | Neskora et al. | 75/117 |
| 3,853,543 | 12/1974 | Thomas | 75/72 |
| 3,855,104 | 12/1974 | Messner | 204/129 |

OTHER PUBLICATIONS

Latimer, W., *Reference Book of Inorganic Chemistry*, New York, 1951, p. 44.

*Primary Examiner*—Walter R. Satterfield
*Attorney, Agent, or Firm*—William R. Laney

[57] ABSTRACT

Metallic copper is recovered from raw materials containing copper in a chemically bound state by first leaching the copper-containing raw material with a ferric chloride solution to extract copper as copper chloride in aqueous solution. The copper is extracted from the copper chloride solution with a liquid ion exchanger which is then stripped with sulfuric acid to form a copper sulfate solution. Metallic copper is recovered from the copper sulfate solution by hydrometallurgical reduction of it with hydrogen gas. An iron chloride salt may be crystallized from the copper-free raffinate from the ion exchange step, and then roasted to yield ferric oxide and hydrochloric acid. The hydrochloric acid produced in the roasting step is electrolyzed to produce hydrogen gas and chlorine gas which can be used in the regeneration of the ferric chloride leach solution.

9 Claims, 1 Drawing Figure

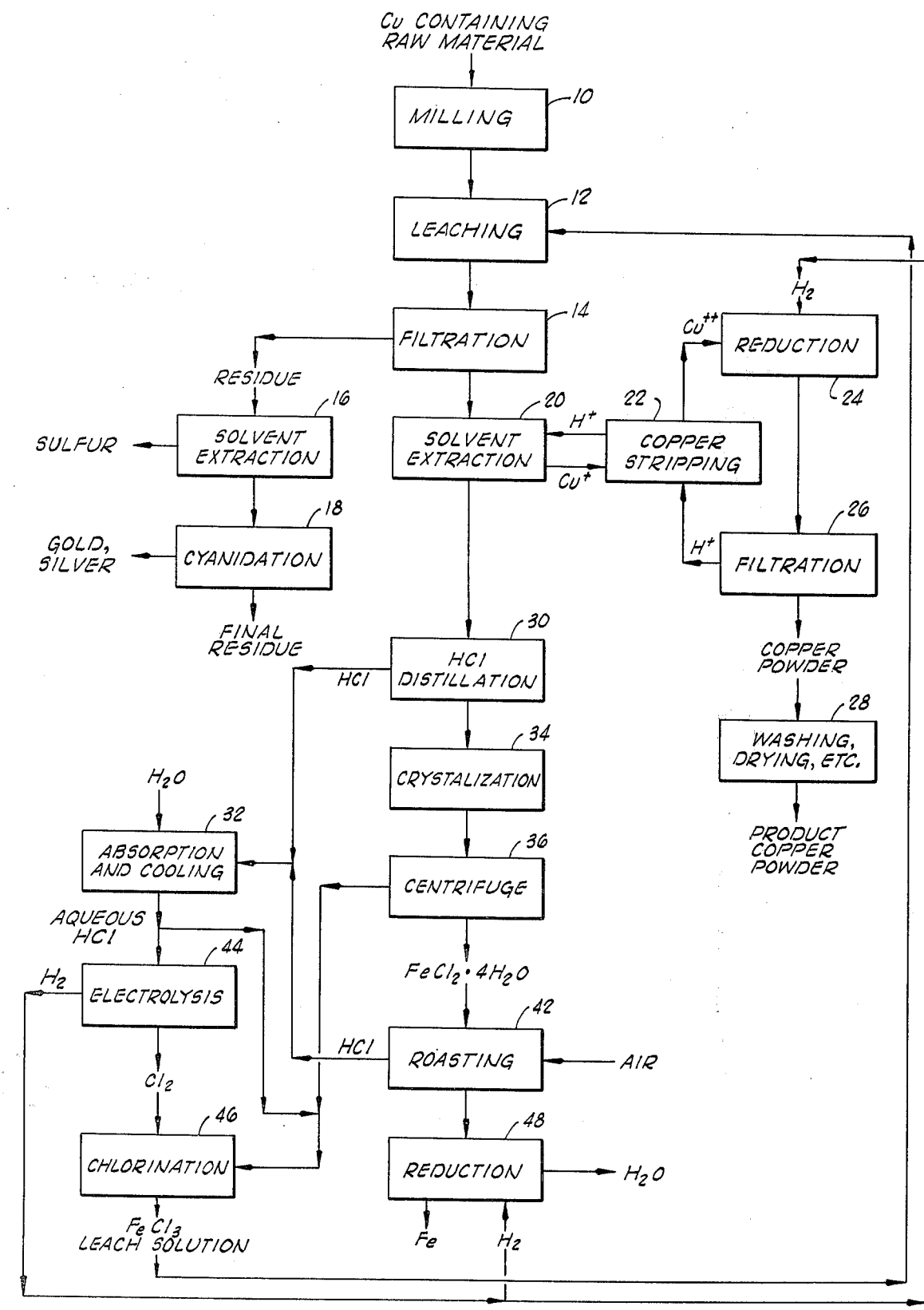

PROCESS FOR THE RECOVERY OF COPPER

BACKGROUND OF THE INVENTION

1. Field of the Invention

This invention relates to the recovery of metallic copper from raw materials which contain chemically bound copper. More particularly, but not by way of limitation, the invention relates to the use of a metallic chloride leach solution for extracting copper values as soluble copper chloride salts from such raw materials, transforming the copper chloride solution to a copper sulfate solution by means of ion exchange, and then reducing the copper in the sulfate solution with a reducing gas to obtain high-grade metallic copper.

2. Brief Description of the Prior Art

A widely practiced method of recovering copper metal from copper-bearing ores is a smelting procedure by which high yields of good-grade, high-purity copper metal are obtained. When ores containing a significant sulfur content are smelted, however, much of the sulfur from the ore is discharged to the atmosphere as sulfur dioxide. For instance, one of the most abundant copper-containing minerals is chalcopyrite which contains copper in chemically combined form with iron and sulfur ($CuFeS_2$). In the processing of this ore, about one ton of sulfur is produced for each ton of copper metal recovered. The recovery of this sulfur as liquid sulfur dioxide or as sulfuric acid is technically feasible, but large-scale production of these compounds will require nearby markets with sufficient capacity to absorb the production; otherwise, the economics of disposing of ths sulfur in these forms becomes unfavorable.

As a solution to this disposal problem, it has been proposed recently by Haver and Wong of the U.S. Bureau of Mines (Report of Investigation 7474, dated 1971) to leach copper ores containing sulfur with a ferric chloride solution and then recover elemental sulfur from the leach solution by filtration and solvent extraction. The leach solution containing the dissolved copper chloride values is passed to a cementation step where the metallic copper is recovered by conventional cementation. The removal of the sulfur from the leach solution and its ultimate recovery in elemental form has the advantage of yielding sulfur in a form which is more easily shipped and stored. A disadvantage of the Haver and Wong process, however, is that crushed sponge iron must be employed in order to obtain metallic (impure) copper.

BRIEF DESCRIPTION OF THE PRESENT INVENTION

The present invention comprises an improved process for recovering copper metal from copper-containing raw materials. The process is especially useful in the recovery of the metal from ores containing sulfur in chemical combination with the copper, such as chalcopyrite, chalcocite and covellite.

The process of the invention comprises the steps of contacting the copper-containing raw material with an aqueous ferric chloride solution to extract the copper values as water-soluble copper chlorides, and converting the aqueous leach solution containing dissolved copper chlorides to a copper sulfate solution, preferably by intimate contact with a liquid ion exchanger to remove copper from the solution thereby producing a copper-free chloride raffinate and then stripping the copper from the ion exchanger with sulfuric acid thereby producing an aqueous acidic copper sulfate solution. The copper sulfate solution is subjected to hydrometallurgical reduction with hydrogen gas to obtain high-grade metallic copper. The copper-free raffinate, containing ferrous chloride generated in the ion exchange step, is crystallized and roasted to produce ferric oxide and hydrochloric acid. The acid is electrolyzed to produce hydrogen and chlorine. The hydrogen is recycled to the reduction step, and the chlorine is utilized as make-up for the ferric chloride-containing leach solution.

In one form of practice of the invention, when sulfur-containing raw materials are leached, the leach solution is filtered prior to copper extraction. The filtered residue is solvent extracted to recover the sulfur. The residue from solvent extraction may be treated further by cyanidation to recover gold and silver values when such are present.

An important object and advantage of the present invention is to produce economically a high-purity, metallic copper powder which is homogeneous and of controlled particle size.

A further advantage of the present invention is that any excess hydrogen gas which is not consumed in the reduction of the copper sulfate leach solution can be employed to reduce some of the ferric oxide obtained as a by-product in the roasting operation.

A further object of the invention is to eliminate the need to employ crushed iron sponge in a cementation process to recover metallic copper from a leach solution derived from the aqueous ferric chloride leaching of copper-containing ores.

An additional object of the invention is to provide a process for recovering copper metal from chalcopyrite and other iron and sulfur-containing raw materials, which does not require the disposal of large amounts of undesirable by-products (such as excess ferrous chloride) of the type produced in the Haver and Wong process.

Additional objects and advantages of the invention will become apparent as the following detailed disclosure of the invention is read in conjunction with the accompanying process flow diagram which illustrates a preferred embodiment of the invention.

DETAILED DESCRIPTION OF PREFERRED EMBODIMENTS OF THE INVENTION

In the discussion of the invention which follows, reference will be made to the drawing which illustrates the flow of reactants and materials in the process and the steps which are employed in one embodiment of the invention.

The milling 10 and leaching 12 of the copper-containing ore or other raw material is carried out in conventional fashion, using an aqueous ferric chloride leach solution. It is desirable to use a leach solution which contains the maximum concentration of ferric chloride which can be used without undesirable precipitation of ferrous chloride following the leaching and which also will maximize the formation of cuprous chloride rather than cupric chloride. The reactions involved, for example, in the case of chalcopyrite ore are:

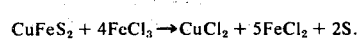

Generally, the concentration of the ferric chloride leach solution is about 20–65 weight percent, and in the case of leaching chalcopyrite is preferably about 20–45 weight percent. The leach solution preferably contains about 2.0 weight percent of hydrochloric, or an amount of some other suitable acid, to adjust the pH to below about 1.7 to avoid hydrolysis of iron salts and their precipitation from solution.

The amount of the ferric chloride solution used in leaching the copper-containing raw material will, of course, vary according to the particular ore or raw material involved and according to the extraction efficiency dictated by economics. In general, however, weight ratios of the aqueous ferric chloride to copper in the raw material leached should be in the range of from about 1:1 to about 15:1. In the case of chalcopyrite ore, weight ratios in the range of from about 6:1 to about 12:1 are usually employed, and a weight ratio in the range of from about 7.5:1 to about 10.5:1 is most preferred.

The temperature at which leaching is carried out may be varied over a wide range; in general, the higher the temperature employed, the more efficient the leaching. The temperature range employed is preferably from about 75°C to the boiling point of the leach solution and is most preferably, for chalcopyrite, from about 85°C to about the boiling point of the solution at atmospheric pressure. At these temperatures, usually about 90% of the copper in the ore can be leached in 1 hour. The contact time required for leaching depends on the temperature used and the nature of the ore. The latter, depending on the activity of the surfaces of the individual particles, could reduce the leaching times indicated above substantially.

The pregnant leach liquor is a slurry containing fine solid particles, including elemental sulfur where a sulfur-containing ore, such as chalcopyrite, has been leached. The slurry is filtered hot in a filtration zone 14 immediately following leaching, and the solid residue may be allowed to dry after water rinsing. If elemental sulfur is present in the residue, it can be extracted 16 with carbon disulfide, perchloroethylene, or other suitable solvent. It may be removed also by sublimation. The remaining leach liquor residue can be subjected to appropriate processing to recover other mineral values. For example, cyanidation 18 for 12 to 48 hours with an aqueous solution of sodium cyanide and calcium oxide can be used to recover gold and silver from the residue.

After the pregnant leach liquor is filtered, the filtrate containing dissolved copper chloride, ferrous chloride, and other metal chloride values, depending on the ore leached, is passed to the solvent extraction zone 20 where the solution is intimately contacted with an organic phase containing a liquid ion exchanger to extract copper from the aqueous leach solution. The copper-loaded organic phase is passed then to a stripping zone 22 where it is intimately contacted with aqueous sulfuric acid which strips copper from the organic phase. The stripped organic phase is recycled to the extractor, while the copper-rich aqueous solution is passed to the hydrogen reduction zone 24 where the solution is intimately contacted with a reducing gas. The reducing gas is preferably hydrogen derived from the electrolysis of hydrochloric acid, as hereinafter described in more detail. It is preferred that the gaseous reduction of cupric ions be conducted in a continuous fashion. Although it is theoretically possible to reduce copper ions from the chloride leach solution, we have found it desirable to use solvent extraction to shift the copper from a chloride solution to a sulfate solution because:

1. The sulfate solution requires less exotic construction materials in the gaseous reduction stage. We have found that in solutions containing high acid concentrations, for example, titanium vessels are adequate.

2. The solvent extraction step eliminates from the final product impurities which may not be easily eliminated in the chloride system.

It will be appreciated that although it is preferred to operate the gaseous reduction step in a tubular reactor through which the reactants are passed in modified plug flow, the reduction can be carried out also as a batch or semi-continuous process according to procedures well known in the art.

One of the major advantages of the process of the invention is that, through the use of the gaseous reduction step, a homogeneous copper powder can be produced, and its purity and particle size can be controlled by controlling the reducing conditions. The fine, high-purity copper powder produced requires only filtration 26, washing and drying 28, before it becomes usable in such manufacturing operations as powder metallurgy.

After copper has been extracted from the leach solution in the solvent extraction zone 20, the leach solution raffinate is passed to a distillation zone 30, where the HCl therein (generated in the solvent extraction step) is removed by distillation and passed to a water absorption column 32.

After HCl has been removed from the leach solution, the leach solution is treated to remove ferrous chloride. The amount of ferrous chloride thus formed exceeds the amount needed in the leaching step. A preferred, although not exclusive, way of recovering the ferrous chloride from the leach solution after removal of the HCl is to crystallize the excess ferrous chloride from the solution in a crystallizer 34. The leach solution from the crystallizer then is centrifuged 36 to remove the hydrated ferrous chloride crystals from the leach solution.

Crystals of ferrous chloride from the crystallization and centrifugation steps are passed to a roasting zone 42 and are roasted in air (or oxygen) saturated with water vapor while being heated to about 300°–800° C.

The roasting of the ferrous chloride crystals results in the production of ferric oxide and hydrochloric acid according to the reaction

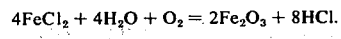

$$4FeCl_2 + 4H_2O + O_2 = 2Fe_2O_3 + 8HCl.$$

The ferric oxide may be disposed of in a number of ways, including, according to a preferred mode of practicing the invention, reduction with a reducing gas which is preferably hydrogen. The hydrochloric acid produced in the roasting step is passed to the absorption column 32. The absorption-cooling column also receives hydrochloric acid from the distillation zone 30, and the hydrochloric acid is diluted here with water which is introduced at the top of the column. The aqueous hydrochloric acid solution is passed from the cooling zone to an electrolysis apparatus 44 where the acid is electrolyzed to obtain hydrogen and chlorine gas. The electrolysis carried out at this point can be conducted according to conventional procedures.

The chlorine derived from the electrolysis zone is passed to a chlorination unit 46 where it is reacted with the ferrous chloride mother liquor from the centrifuge 36. In the chlorination unit, an exothermic chlorination reaction occurs which regenerates the ferric chloride leach solution. The raw ferric chloride leach solution can be recycled then to the leaching step.

It should be noted that HCl must be added to the mother liquor from the centrifuge before it passes to the chlorination zone. Small amounts of hydrochloric acid are desirable in the leach solution in order to prevent hydrolysis of the ferric chloride in the leach solution. In the case of some types of ores, such as ores containing large amounts of calcite, leaching is more effective with relatively high concentrations of hydrochloric acid in the raw leach solution, and, in such cases, it may be desirable to add substantial amounts of HCl which can be supplied from the absorption-cooling zone 32 to the mother liquor.

The hydrogen gas produced upon electrolysis of the hydrochloric acid is preferably recycled from the electrolysis zone to the gaseous copper reduction step of the reaction. In most instances, an independent make-up source of hydrogen is not required since a sufficient amount of hydrogen gas for use in the reduction can be developed by electrolysis of the hydrochloric acid. In fact, in many instances, a surplus of hydrogen gas is generated, and such surplus can be diverted to a second reduction zone 48 where the ferric oxide product of the roasting operation is reduced to metallic iron with the concurrent production of water. The ferric oxide reduction is preferably carried out in a fluidized bed reactor.

The practice of the process of the present invention and its utility will be further illustrated by the following example which shows the manner in which the copper recovery is used in the treatment of chalcopyrite ore.

298 pounds of finely ground chalcopyrite concentrate from McGill, Nevada, containing 61.5 weight percent $CuFeS_2$ (21.3 weight percent copper) are leached with 1133 pounds of an aqueous ferric chloride leach solution containing 487 pounds of ferric chloride and 70 pounds of hydrochloric acid. The leaching extracts 184 pounds of material from the ground ore, and the pregnant leach slurry formed contains about 6.9 weight percent cuprous chloride, 35.5 weight percent ferrous chloride, and 4.5 weight percent elemental sulfur.

The pregnant leach slurry is filtered to remove solids, and the sulfur is extracted from the solid residue with carbon disulfide. The filtrate leach solution is subjected to a three-stage contactor in which the leach solution is contacted with a kerosene solution of a commercially available liquid ion exchange agent sold under the tradename LIX by General Mills Chemicals, Inc. of Minneapolis, Minnesota (40 volume percent of LIX in kerosene), or other suitable extractant. The LIX extractants are well known organic ion exchange reactants generically termed α-hydroxyoximes and have the general formula

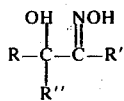

where R, R' and R'' may be any of a variety of hydrocarbon radicals. Such extractants are described in greater detail in U.S. Pat. No. 3,666,446; U.S. Pat. No. 3,224,873; U.S. Pat. No. 3,284,501; U.S. Pat. No. 3,428,449; U.S. Pat. No. 3,440,036; U.S. Pat. No. 3,455,680 and U.S. Pat. No. 3,823,981. This solvent extraction removes about 97 percent of the copper from the leach solution. The copper-loaded kerosene phase is subjected to copper stripping by aqueous sulfuric acid in a two-stage contactor; in this manner, essentially all the copper is removed from the organic phase and passed into the aqueous sulfuric acid phase.

The copper sulfate solution resulting from stripping copper from the organic phase is contacted with about 1.5 pounds of hydrogen gas in a tubular reactor operated non-isothermally so that a temperature gradient is established from ambient temperature (75°F) at the entrance of the reactor to a temperature of about 400°F at the discharge end of the reactor. The hydrogen gas used for reducing the copper sulfate in solution is slightly in excess of that which is stoichiometrically required to reduce the amount of copper ions present to elemental copper.

As a result of hydrogen reduction in the tubular reactor, about 61.5 pounds of powdered copper metal are precipitated and filtered from the sulfate solution. The leach solution raffinate, containing about 42.6 weight percent ferrous chloride and 3.6 weight percent hydrochloric acid, is passed to a distillation column where HCl is removed. From the distillation column, the copper- and HCl-free leach solution raffinate is passed to a crystallizer where 199 pounds of hydrated ferrous chloride crystals ($FeCl_2.4H_2O$) are recovered by crystallization. The mother liquor from the crystallization step containing about 40.0 weight percent ferrous chloride is passed to a chlorinator vessel for the reconstitution of the ferric chloride leach solution.

The hydrated ferrous chloride crystals from the crystallizer are roasted in air saturated with water vapor at about 600° C. to yield about 73 pounds of hydrochloric acid and about 80 pounds of ferric oxide ($Fe_2O_3$). The acid from the distillation of the leach solution and from the roasting zone are combined, absorbed in water, and subjected to electrolysis.

Electrolysis of the acid yields about 3 pounds of hydrogen and about 106 pounds of chlorine. The chlorine is passed to the chlorinator where it is reacted with the aqueous ferrous chloride solution (the mother liquor from the crystallization zone) to yield 1133 pounds of a 43 weight percent aqueous ferric chloride solution. One pound of hydrochloric acid is added to the ferric chloride solution to prevent hydrolysis of iron, and the solution is recycled to the leaching step. The hydrogen product stream from the electrolysis is split, and that which is in excess of that which is needed to reduce the copper sulfate solution is used to reduce the ferric oxide to metallic iron.

Although certain preferred embodiments of the invention have been described in order to illustrate the practice of the invention, it will be understood that various changes and innovations can be effected without departure from the basic principles which underlie the invention. Changes and modifications of this type therefore are deemed to be circumscribed by the spirit and scope of the invention except as the same may be necessarily limited by the appended claims or reasonable equivalents thereof.

What is claimed is:

1. A process for recovering copper from coppercontaining raw materials comprising:

leaching the raw material with an aqueous ferric chloride leach solution to solubilize the copper as copper chloride salts;

filtering the pregnant leach solution to remove insoluble solids therefrom;

extracting the copper from the chloride solution with a liquid extractant;

contacting the liquid extractant loaded with cupric ions with sulfuric acid to strip the extractant, and provide an aqueous copper sulfate solution;

contacting said aqueous copper sulfate solution in a reducing zone with hydrogen gas derived from an electrolysis step carried out subsequently in the process as hereinafter described, to reduce copper ions in solution to metallic copper;

recovering insoluble solid metallic copper from the sulfate solution;

removing HCl from the leach solution raffinate remaining after copper extraction with the liquid extractant;

recovering crystals of ferrous chloride from the leach solution raffinate remaining after solvent extraction to remove copper from the leach solution;

roasting the ferrous chloride crystals to yield HCl;

electrolysing the hydrochloric acid to produce hydrogen and chlorine;

recycling hydrogen to the reducing zone to reduce copper ions to copper metal; and reacting chlorine with the residual leach solution raffinate remaining after crystals of ferrous chloride have been removed therefrom to produce and regenerate the ferric chloride leach solution.

2. The process defined in claim 1 and further characterized as including the step of separating solid, elemental sulfur from other insoluble solids removed from the leach solution by filtration.

3. The process as defined in claim 1 wherein said hydrogen gas and said sulfate solution are continuously and concurrently introduced to said reducing zone, and the reduction of copper ions to metallic copper is carried out continuously.

4. The process defined in claim 1 wherein ferrous chloride crystals are recovered from the leach solution raffinate by crystallization and centrifugation.

5. The process defined in claim 1 wherein said aqueous ferric chloride leach solution contains from about 20 to about 65 weight percent ferric chloride.

6. The process defined in claim 1 wherein said aqueous ferric chloride leach solution is acidified to reduce the pH thereof to below about 1.7.

7. A process for recovering metallic copper from an aqueous solution containing copper chloride salts comprising:

extracting the copper from the aqueous solution by contacting the aqueous solution with an organic liquid solution of an organic ion exchange compound capable of chemically combining with copper ions from the copper chloride salts to form an organic solution of copper compounds and a substantially copper-free raffinate;

treating the copper-loaded organic liquid extractant with sulfuric acid to strip copper from the extractant and form a copper sulfate solution;

contacting the copper sulfate solution with a reducing gas to reduce copper ions in solution to metallic copper;

recovering insoluble solid metallic copper from the sulfate solution;

removing HCl from the raffinate remaining after the solvent extraction step;

crystallizing ferrous chloride crystals from the HCl-depleted raffinate;

roasting the ferrous chloride crystals to yield HCl and ferric oxide;

electrolyzing HCl yielded by roasting, and by removal from the solvent extraction raffinate, to produce hydrogen and chlorine; and reducing the ferric oxide crystals to metallic iron by contact with hydrogen gas derived from the electrolysis.

8. The process defined in claim 7 wherein the reducing gas utilized for contacting the copper sulfate solution is hydrogen derived from the electrolysis of HCl.

9. A process for recovering copper from chalcopyrite ore comprising:

leaching the chalcopyrite ore with an aqueous solution of ferric chloride leach solution containing hydrochloric acid in an amount sufficient to reduce the pH thereof below about 1.7 to solubilize the copper in the chalcopyrite ore as copper chloride salts;

filtering the pregnant leach solution to remove insoluble solids, including sulfur, therefrom;

extracting the copper from the filtrate remaining after removal of insoluble solids from the copper chloride-containing pregnant leach solution by the use of a liquid organic extractant capable of chemically combining with the copper ions from the copper chloride salts in the filtrate to form an organic solution of copper compounds, and leaving a substantially copper-free raffinate;

separating solid, elemental sulfur from other insoluble solids removed from the pregnant leach solution by filtration;

treating the loaded organic extractant having chemically bound copper ions therein with sulfuric acid to form an aqueous copper sulfate solution;

continuously contacting said aqueous copper sulfate solution in a reducing zone with hydrogen gas continuously supplied from a subsequent electrolysis step in the process, as hereinafter claimed, to reduce copper ions in solution to metallic copper;

filtering insoluble solid metallic copper from the aqueous solution subjected to contact with hydrogen gas;

removing hydrogen chloride from the leach solution raffinate remaining after said copper extraction using the liquid organic extractant;

recovering crystals of ferrous chloride from the leach solution raffinate after removal of hydrogen chloride and copper from the leach solution raffinate;

charging to a chlorination zone the remaining leach solution raffinate formed after removal of hydrogen chloride and crystals of ferrous chloride;

roasting the ferrous chloride crystals to yield hydrogen chloride and ferric oxide;

adding water to the hydrogen chloride developed by roasting the ferrous chloride crystals and by removal from the leach solution to form hydrochloric acid;

electrolyzing the hydrochloric acid to produce hydrogen and chlorine;

continuously recycling hydrogen from the electrolysis to the reducing zone to reduce copper ions to copper metal; and continuously charging chlorine gas from the electrolysis to the chlorination zone to regenerate the ferric chloride leach solution.

* * * * *